Patented Aug. 21, 1945

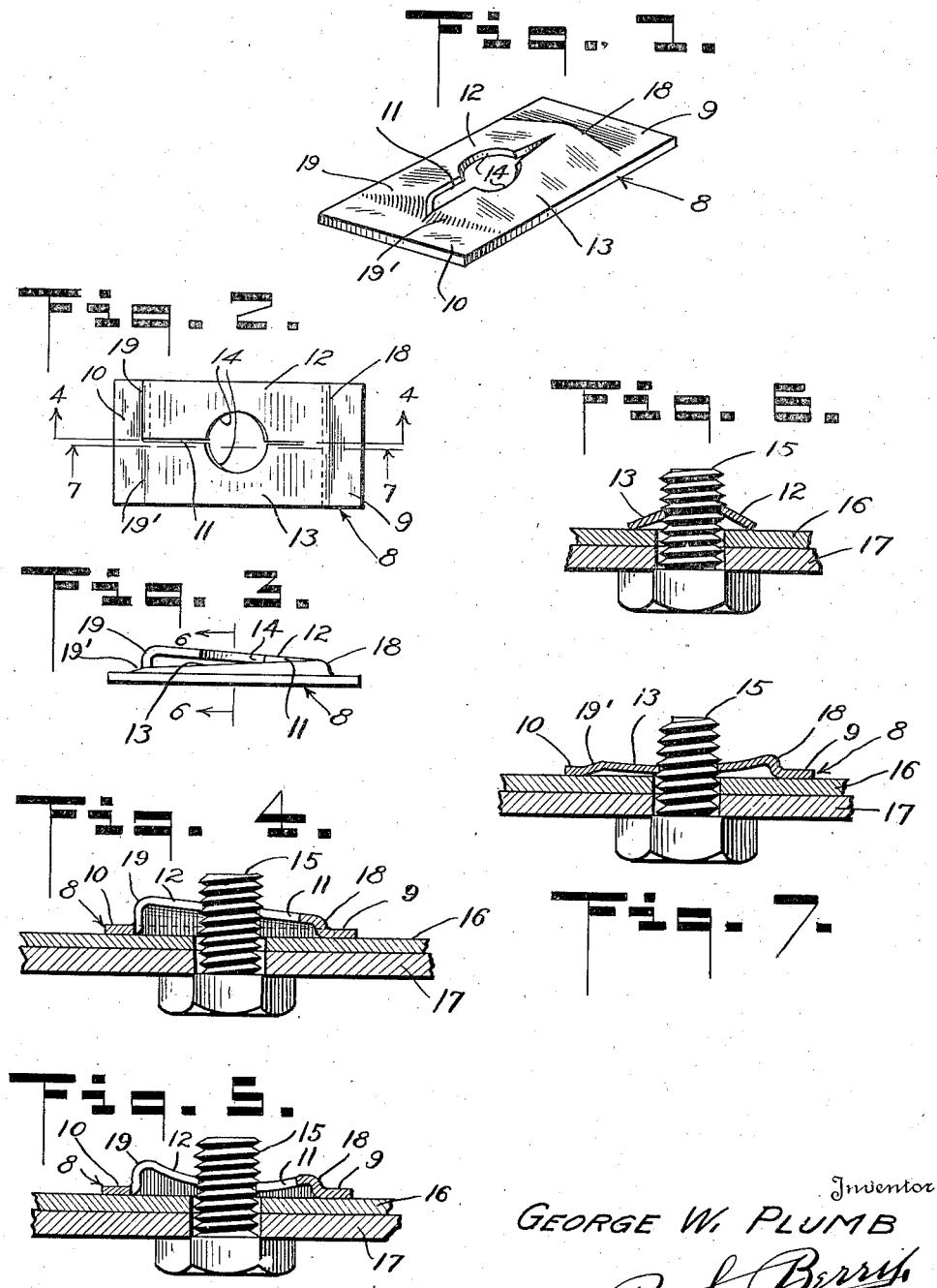

2,383,211

UNITED STATES PATENT OFFICE 2,383,211

SPRING NUT

George W. Plumb, Glendale, Calif., assignor to Adel Precision Products Corp., a corporation of California Application December 6, 1944, Serial No. 566,845

8 Claims. (Cl. 85—36)

This invention relates to nuts of the type in which a body portion made of resilient sheet metal is provided with opposed outwardly offset portions arranged so that edges thereof will have a screw threaded engagement with a bolt or like fastening turned therebetween.

An object of this invention is to provide a nut of the character above described which may be manufactured with greater ease and facility, at a lower cost and with less material than similar nuts heretofore produced, without sacrificing strength and durability and while providing for a most reliable self locking action on a bolt or like fastening.

A further object is to provide a nut such as described which is comparatively light as to weight and subject to a resilient yielding action throughout all of its area except at seating portions of comparatively small area which portions are arranged to rest on the object to which the nut is applied, so that the remainder of the nut in the form of laterally juxtaposed outwardly offset portions will readily yield upon the tightening of a bolt or like fastening threadedly engage therewith, to not only assure an effective locking action on the bolt or the like but best adapt the nut to certain installations where such "over all" resilient action is desirable.

Another object of my invention is to provide a nut such as described which may be readily stamped from a narrow strip of resilient sheet metal of narrower formation than heretofore employed in making stamped nuts, with the nut having opposite end portions adapted to seat on a member to which the nut is applied while the portion between said ends is for the most part disposed in outwardly offset relation to the plane of said ends and longitudinally divided to form arch portions between the latter of which a bolt or the like may be gripped and held, the outer edges of said arch portions being also disposed to have seating engagement with said member when the bolt is tightened in the nut, while the inner edges of said arch portions are outwardly offset but subject to inward yielding or flexing movement so as to grip the bolt and lock the nut thereon.

With the foregoing objects in view, together with such other objects and advantages which may subsequently appear, the invention resides in the parts and in the combination, construction and arrangement of parts hereinafter described and claimed, and illustrated by way of example in the accompanying drawing, in which:

Fig. 1 is a perspective view of a spring nut embodying my invention;

Fig. 2 is a top plan view of the nut;

Fig. 3 is a side elevation of the nut;

Fig. 4 is a sectional view taken on the line 4—4 of Fig. 2, showing the nut as installed but before being tightened;

Fig. 5 is a sectional view corresponding to Fig. 4 showing the nut as it would appear when the bolt is tightened;

Fig. 6 is a cross sectional view taken on the line 6—6 of Fig. 3 showing the nut installed;

Fig. 7 is a sectional view taken on the line 7—7 of Fig. 2, showing the nut installed.

Referring more specifically to the drawing, it will be seen that a nut made in accordance with this invention generally comprises a substantially rectangular body portion 8 of resilient sheet metal formed with bearing or seat portions 9 and 10 at its ends and having the remainder thereof divided by a slit 11 to form laterally juxtaposed elongated arch or bridge portions 12 and 13. These bridge portions are for the most part outwardly offset and have a complementary arcuate edge portions 14 formed by notching or recessing the opposed inner side edges thereof, which edge portions define a bolt-receiving opening in the nut and are adapted to have tensioned screw threaded engagement with a bolt or like member 15 applied as shown in Figs. 4 to 7 inclusive to hold members 16 and 17 together.

In forming bridge portions 12 and 13 the body portion 8 is given an outward bend 18 which extends transversely across the full width of the body portion at a point spaced inwardly from one end edge thereof, thereby defining at one end of the body the seat portion 9 which latter is rectangular and takes up, as here shown, but a small part of the area of the nut. Similar outward bends extend from the slit 11 transversely to the outer edges of the body 8, and complete the formation of the bridges 12 and 13 as well as define the seat portion 10. In this connection it should be noted that the slit 11 extends between, that is, terminates at the bends 19 and 19' while its other end is spaced well inwardly of the bend 18.

The bend 18 forms a hump between its ends, or in other words, is gradually decreased in its outward extent or slopes from a point centrally of its ends towards the outer edges of the bridge portions 12 and 13, while the bends 19 and 19' are correspondingly decreased in their outward extent or sloped toward the outer edges of the bridge portions. The bend 19 has a greater outward extent than bend 18, while bend 19' is of lesser outward extent than bend 18. Consequently the bridge portions are inclined in opposite directions transversely and longitudinally and due to the location and relative outward extent of the bends 18, 19 and 19' the inner longitudinal edge of the bridge 12 is outwardly offset a greater extent than the inner longitudinal edge of the bridge 13. This arrangement of the bridge portions disposes the arcuate edges 14 at the proper helix angle or pitch to threadedly engage the threads of the bolt and disposes the outer edges of said bridge portions in substantially coplanar relation to the seat portions 9 and 10 or, if not exactly coplanar, in such position near the plane of the seat portions that upon tightening the nut on the bolt, these outer edges will seat on the member 16 as best shown in Fig. 6.

Inasmuch as the inner edges of the arches 12 and 13 are well outwardly offset, the arches are subject to being flexed and yieldingly forced inwardly when the bolt is tightened even though the outer edges of said arches are seated on the member 16, thus providing for a tensioned and locking engagement of the edges 14 with the bolt. If, only the ends 9 and 10 were seated on the member 16 said ends would rock or turn outwardly so that the desired yielding of the arches 12 and 13 would be interfered with and the nut would not seat effectively on member 16. Thus it is seen that in having the outer edges of the arch or bridge portions as well as the end portions 9 and 10 disposed to seat on the member 16, the nut is seated along its margins so that the desired resilient action of the remainder of the nut is assured. Moreover, this arrangement makes for a narrower nut and requires less material than nuts having flat seating portions on the sides as well as the ends thereof.

It will now be apparent that when the bolt is tightened, the bridge portions 12 and 13 will be bowed and flexed inwardly toward the member 16 as shown in Figs. 5 and 7 and by such action the arcuate edges 14 are caused to bite into the bolt and wedge against the threads thereof under spring tension so as to effectively lock the nut and bolt against working loose. When the bolt is tightened as aforesaid the entire nut is flexed except the small seat or bearing portions 9 and 10 and the outer edges of the bridge portions 12 and 13 which rest on the member to which the nut is applied. The "over all" resilient or spring action of this nut makes it well suited for installations where a spring or yielding action is desired.

It will now be seen that my improved nut will afford all of the advantages of similar nuts while being considerably lighter as to weight, of smaller size, requiring less material and forming operations and yet adding resilience or spring action without sacrificing strength and durability and at the same time providing for a most reliable "locking" action on the bolt.

While I have shown and described a specific embodiment of my invention I do not limit myself to the exact details of construction set forth, and the invention embraces such changes, modifications and arrangement as come within the purview of the appended claims.

I claim:

1. In a spring nut, an elongated body portion having an outward bend extending transversely across the full width thereof at a point spaced inwardly of an end of the body portion, a pair of similar outward bends differing as to outward extent from one another and the first named bends, extending across the body portion at a point spaced inwardly of the other end of the body portion, the said bends providing seat portions at the ends of the body portion and disposing substantially all of the remainder of the body portion in outwardly offset relation to said seat portions, said outwardly offset portion being divided by a slit to define laterally juxtaposed arch portions having their opposed edges spaced apart and shaped to provide edge portions defining an opening for reception of a bolt or screw, said arch portions being oppositely inclined transversely from their opposed edges to their outer edges with the outer edges in substantially coplanar relation to said seat portion.

2. In a spring nut, an elongated body portion having an outward bend extending transversely across the full width thereof at a point spaced inwardly of an end of the body portion, a similar outward bend extending but part way across the body portion at a point spaced inwardly of the other end of the body portion, the said ends providing seat portions at the end of the body portion and disposing a part of said body portion in outwardly offset relation to said seat portions; and laterally juxtaposed elongated arch portions formed by a slit in said offset part of the body portion, said arch portions having opposed bolt-engaging edges intermediate their ends defining an opening for reception of a bolt, said arch portions being oppositely inclined longitudinally and relatively positioned to dispose said arcuate edges for a tensioned and screw threaded engagement with the bolt, and being oppositely inclined transversely to dispose the outer edges thereon in position to rest on the member or object on which said seat portions are seated.

3. In a nut, an elongated body portion of resilient sheet metal, seat portions extending across opposite ends of said body portion adapted to rest on the member to which the nut is applied, all of the body portion between said seat portions except the side edges thereof being outwardly offset from said seat portions; and laterally juxtaposed alongated arch portions formed by dividing and separating the offset portion of the body portion along its longitudinal medial line, said arch portions having opposed longitudinal edges in offset relation to one another and provided with bolt-engaging edges forming a bolt opening and which will have screw threaded tensioned engagement with a bolt turned therebetween.

4. In a nut, a body portion of resilient sheet metal, seat portions extending across opposite margins of said body portion adapted to rest on the member to which the nut is applied, said body portion between said seat portions being outwardly offset from said seat portions; and laterally juxtaposed elongated arch portions formed by dividing the offset portion of the body portion, said arch portions being oppositely inclined both longitudinally and transversely and having opposed edge portions defining a bolt opening and adapted to have tensioned screw threaded contact with a bolt, the outer longitudinal edges of said arch portions disposed to seat on said member between said seat portions.

5. In a nut, a body portion of resilient sheet metal, seat portions extending across opposite margins of said body portion adapted to rest on the member to which the nut is applied, said body portion between said seat portions being outwardly offset; laterally juxtaposed elongated arch portions formed by slitting the offset portion of the body portion; and edge portions on said arch portions forming a bolt opening, said arch portions being oppositely inclined longitudinally and one of them offset a greater extent than the other, so that said edge portions are disposed for a threaded engagement with a bolt turned in said opening, said arch portions being oppositely inclined from the inner to the outer edges thereof so that the latter are disposed to contact the member on which said seat portions are seated upon the tightening of the nut on the bolt.

6. In a nut, a plate-like body portion of resilient material, laterally juxtaposed portions outwardly offset from and formed integral with said body portion, and bolt-engaging edge portions on opposed edges of said outwardly offset portions spaced apart for reception of a bolt therebetween, said offset portions being constructed and arranged so that said bolt-engaging edge portions will have a screw threaded engagement with a bolt turned therebetween; said outwardly offset portions having their outer edges disposed to seat on the object to which the nut is applied, when the bolt is tightened in the nut.

7. In a nut, a body portion of resilient metal, laterally juxtaposed portions outwardly offset from said body portion and having a slit therebetween said offset portions extending from opposite edges of the body portion to said slit, and bolt-engaging edge portions on the opposed inner edges of said outwardly offset portions for reception of a bolt therebetween, said offset portions being constructed and arranged so that said bolt-engaging edge portions will have a tensioned screw threaded engagement with a bolt turned therebetween; said offset portions being arranged to yieldingly bow or flex inwardly toward the object to which the nut is applied when the bolt is tightened in the nut, said offset portions being oppositely inclined transversely thereof so that their outer longitudinal edges are disposed to seat on said object.

8. As an article of manufacture, a sheet metal nut comprising a blank having a portion disposed entirely within the periphery of the blank, offset from the remainder of the blank, said offset portion having an opening therein for reception of a screw threaded fastening, said opening having at least one diametrical dimension which is substantially less than the outside diameter of the threads of the screw threaded element adapted for use with the nut, said offset portion having a slit dividing it so that the division intersects said opening; the region of said offset portion adjacent said opening having the edges thereof which define the opening helically pitched substantially in correspondence to the helical pitch of the threads of said fastening, and edge portions on said offset portion shaped and disposed to contact the member against which the nut bears when the fastening and nut are tightened.

GEORGE W. PLUMB.